No. 725,415. PATENTED APR. 14, 1903.
R. DAHLANDER & K. A. LINDSTRÖM.
DEVICE FOR VARYING THE NUMBER OF POLES IN ALTERNATE
CURRENT MOTORS.
APPLICATION FILED APR. 9, 1897.
NO MODEL.

WITNESSES:
D. D. Moff
Peter N. Ross.

INVENTORS
Robert Dahlander
Karl N. Lindström
BY
Henry Connett
ATTORNEYS

United States Patent Office.

ROBERT DAHLANDER AND KARL ARVID LINDSTRÖM, OF WESTERÅS, SWEDEN, ASSIGNORS TO GENERAL ELECTRIC COMPANY, OF SCHENECTADY, NEW YORK.

DEVICE FOR VARYING THE NUMBER OF POLES IN ALTERNATE-CURRENT MOTORS.

SPECIFICATION forming part of Letters Patent No. 725,415, dated April 14, 1903.

Application filed April 9, 1897. Serial No. 631,363. (No model.)

*To all whom it may concern:*

Be it known that we, ROBERT DAHLANDER, engineer, and KARL ARVID LINDSTRÖM, engineer, subjects of the King of Sweden and Norway, and residents of Westerås, in the Kingdom of Sweden, have invented certain new and useful Improvements in Devices for Varying the Number of Poles in Alternate-Current Motors, of which the following is a specification.

This invention relates to that class of drum-windings for alternating-current motors in which the conductors are so arranged and connected that by simply varying the coupling of the same the number of poles, and consequently the speed of rotation of the motor, may be altered. In the winding which we have devised the conductors are so arranged that each two adjacent conductors or groups of conductors of one phase embrace one of the conductors or groups of conductors of each of the other phases. In other words, the winding is so arranged that the conductors or groups of conductors for the several phases follow each other in regular progression around the member on which they are wound. The conductors are connected to form separate windings for the several phases, and the winding for each phase is divided into two sections with the terminal connections so arranged that the windings may be connected either in such a manner that the current will flow in the same direction through both sections of each winding or in such a manner that the direction of current-flow in one of the sections will be reversed.

Figure 2:
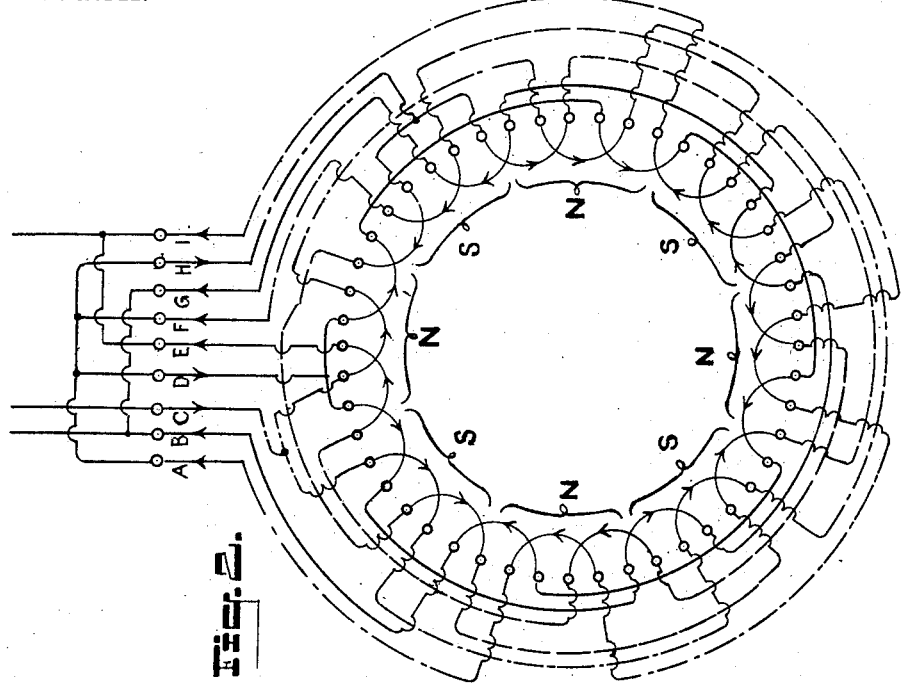
Figure 1:
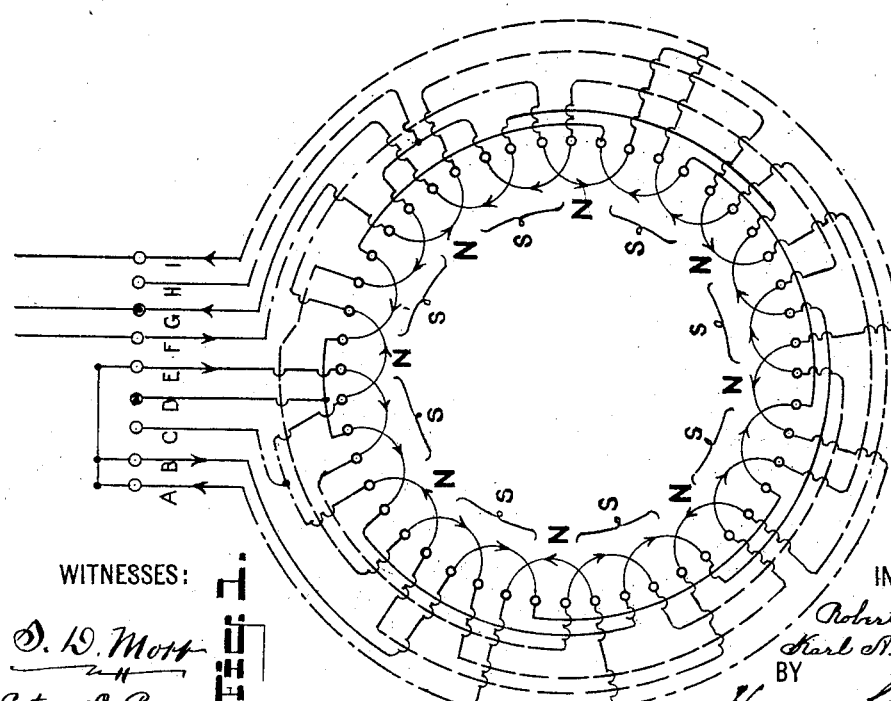

In the accompanying drawings, which illustrate an embodiment of our invention, Figure 1 represents diagrammatically a drum-winding for a three-phase motor with the windings so connected as to produce a field having sixteen poles, and Fig. 2 is a similar diagram representing the same winding connected to produce a field having only eight poles.

Referring to the figures of the drawings, the small circles indicate the relative positions of the conductors or groups of conductors which constitute the drum-winding, it being understood that the drawings are diagrams merely and that an actual winding may comprise a number of conductors for each of the small circles shown in the drawings. The end connections of the windings are indicated by the full and dotted lines connecting the small circles to one another and to the terminals A to I, inclusive.

By tracing the circuits from terminal to terminal it will be found that A and F are the end terminals, and C the middle terminal, of one winding; B and G the end terminals, and D the middle terminal, of another winding, and E and I the end terminals, and H the middle terminal, of the third winding.

With the terminal connections arranged as shown in Fig. 1 the windings for the three phases are connected together at one end and at the other end are connected each to one of the three-phase mains, the three middle terminals being left on open circuit. This connection gives sixteen poles, as indicated by the letters N S in Fig. 1.

By making use of the middle terminals it is possible, however, to reverse the direction of current-flow in one of the sections of each of the three windings, and with the conductors arranged as shown in the drawings such a reversal will give a field having only eight poles.

In Fig. 2 we have shown an arrangement of terminal connections which may be used to obtain the smaller number of poles. These connections are such that the two sections of each winding are connected in multiple, the end terminals A and F being connected together and the end terminals B and G and E and I being also similarly connected. The three-phase mains are then connected one to the end terminals B and G, another to the end terminals E and I, and the third to the middle terminal C of the other winding, the end terminals A and F of this latter winding being connected to the middle terminals D and H of the other two windings to complete the common connection. In the arrangement shown in the drawings the windings are always connected in Y.

The arrangement of connections above described—namely, with the two sections of each winding connected in series for the larger number of poles and in multiple for the smaller number—will give in both cases about the same ratio of the current when the motor is running idle to the watt-current.

It will be noted that in making the connections, as illustrated in Figs. 1 and 2, the connections of all nine of the terminals are changed in changing from one number of poles to the other; but evidently our invention is not limited to the particular arrangement shown in the drawings. Any suitable arrangement of the terminal connections may be employed, and it is even possible to reduce the number of terminals to seven by connecting the extremities of the three windings at one end to a common terminal.

What we claim as new, and desire to secure by Letters Patent of the United States, is—

1. A non-synchronous motor, having primary drum-windings suited to the maximum number of poles $n$, with the free ends of the windings provided with terminals, and also with other terminals so connected as to divide each of the said windings into halves, whereby in coupling up in different ways, different pole-numbers may be obtained.

2. A non-synchronous motor, having primary drum-windings with the free ends of said windings provided with terminals, and said windings also provided with other terminals so connected as to divide each of the windings into halves, the halves of said windings being coupled in series so as to obtain the maximum number of poles $n$, the beginning, end and middle of each winding having terminals, by the coupling of which in different ways, the pole-numbers $n$ and $\frac{n}{2}$ are obtained, both halves of each winding being coupled in parallel for the smaller pole-number.

3. A polyphase motor having drum-windings for obtaining two different pole-numbers and rates of rotative speed, the one rate being double that of the other, the windings for each phase being divided into two halves and the conductors being so arranged that each two adjacent conductors or groups of conductors of one phase embrace one of the conductors or groups of conductors of each of the other phases, whereby in coupling together such halves in different ways, different pole-numbers may be obtained.

4. A polyphase motor having drum-windings for obtaining two different pole-numbers and rates of rotative speed, the conductors being so arranged that each two adjacent conductors or groups of conductors of one phase embrace one of the conductors or groups of conductors of each of the other phases and the winding for each phase being divided into halves with the two halves coupled in series, and terminals connected to the joining-points of said halves, whereby the windings for each phase are provided with three terminals which may be coupled in such a manner as to obtain either of two pole-numbers at will.

5. A polyphase motor having drum-windings comprising a separate winding for each phase, each of said separate windings comprising two sections, means for connecting the said windings to a polyphase source and to each other with the two sections of each separate winding in series with one another for one number of poles, and means for changing the connections so that the two sections of each winding will be connected in multiple, with the direction of current-flow reversed in one of said sections, to produce another different number of poles.

6. A three-phase motor having drum-windings comprising a separate winding for each phase, each of said separate windings comprising two sections, means for connecting the said windings to a three-phase source and to each other in such a manner as to produce a field having a certain number of poles, and means for changing the connections so as to reverse the direction of current-flow in one of the sections of each winding, thereby producing a field having half or double the number of poles.

7. A three-phase motor having three drum-windings with the conductors so arranged that each two adjacent conductors or groups of conductors of one phase embrace one of the conductors or groups of conductors of each of the other phases, the said conductors being connected to form separate windings for the several phases, each separate winding comprising two sections, and terminal connections so arranged that the said windings may be connected to a three-phase source and to each other, either in such a manner that the current will flow in the same direction through the two sections of each winding, or in such a manner that the direction of current-flow in one of the sections will be reversed.

8. A three-phase motor having three drum-windings with the conductors so arranged that each two adjacent conductors or groups of conductors of one phase embrace one of the conductors or groups of conductors of each of the other phases, the said conductors being connected to form separate windings for the several phases, each separate winding comprising two sections, and means for connecting said windings either in such a manner that the current will flow in the same direction through the two sections of each winding, or in such a manner that the direction of current-flow in one of the sections will be reversed.

In witness whereof we have hereunto signed our names in the presence of two subscribing witnesses.

ROBERT DAHLANDER.
KARL ARVID LINDSTRÖM.

Witnesses:
  E. J. TODEN,
  F. G. LONNQUIST.